(12) United States Patent
Wong et al.

(10) Patent No.: US 8,662,793 B2
(45) Date of Patent: Mar. 4, 2014

(54) FLOATING WIND FARM WITH ENERGY STORAGE FACILITY

(76) Inventors: Carlos Wong, Macau (MO); Livia Wong, Macau (MO)

( * ) Notice: Subject to any disclaimer, the term of this patent is extended or adjusted under 35 U.S.C. 154(b) by 179 days.

(21) Appl. No.: 13/111,954

(22) Filed: May 20, 2011

(65) Prior Publication Data

US 2012/0294681 A1 Nov. 22, 2012

(51) Int. Cl.
*B63B 35/44* (2006.01)
(52) U.S. Cl.
USPC ......... 405/224; 405/223.1; 114/264; 114/266
(58) Field of Classification Search
USPC ............ 405/195.1, 223.1, 224, 205; 114/264, 114/266, 267
See application file for complete search history.

(56) References Cited

U.S. PATENT DOCUMENTS

| | | | |
|---|---|---|---|
| 7,075,189 B2 * | 7/2006 | Heronemus et al. ............ 290/44 |
| 7,156,586 B2 * | 1/2007 | Nim ........................... 405/223.1 |
| 7,293,960 B2 * | 11/2007 | Yamamoto et al. ............. 416/85 |
| 8,057,127 B2 * | 11/2011 | Lopez et al. ................... 405/224 |
| 8,235,629 B2 * | 8/2012 | Jakubowski ................... 405/224 |
| 2003/0168864 A1 * | 9/2003 | Heronemus et al. ............ 290/55 |
| 2006/0165493 A1 * | 7/2006 | Nim ........................... 405/223.1 |
| 2008/0240864 A1 * | 10/2008 | Belinsky .................... 405/223.1 |
| 2008/0245286 A1 * | 10/2008 | Adamo ......................... 114/267 |
| 2010/0150664 A1 * | 6/2010 | Jakubowski ................... 405/224 |
| 2010/0219645 A1 * | 9/2010 | Yamamoto et al. ............. 405/224 |
| 2011/0037264 A1 * | 2/2011 | Roddier et al. ................ 405/224 |
| 2011/0070032 A1 * | 3/2011 | Frazier et al. ................. 405/210 |
| 2011/0074155 A1 * | 3/2011 | Scholte-Wassink .......... 405/224 |
| 2011/0107953 A1 * | 5/2011 | Jahnig .......................... 114/264 |
| 2011/0135398 A1 * | 6/2011 | Lopez et al. ................ 405/195.1 |
| 2011/0142683 A1 * | 6/2011 | Sharples et al. ............... 405/224 |
| 2011/0158751 A1 * | 6/2011 | Ohkubo et al. ............... 405/224 |
| 2011/0241347 A1 * | 10/2011 | Boureau et al. ............... 405/224 |
| 2011/0318112 A1 * | 12/2011 | They ............................. 405/203 |
| 2012/0014752 A1 * | 1/2012 | Caruso ......................... 405/224 |
| 2012/0043763 A1 * | 2/2012 | De Boer ....................... 114/264 |
| 2012/0061973 A1 * | 3/2012 | Zelony ......................... 405/210 |
| 2012/0073487 A1 * | 3/2012 | Pantaleon Prieto et al. .. 114/264 |
| 2012/0103244 A1 * | 5/2012 | Gong et al. ................... 114/265 |
| 2012/0121340 A1 * | 5/2012 | Pao .............................. 405/224 |
| 2012/0155967 A1 * | 6/2012 | Nagurny et al. ............... 405/224 |
| 2012/0183359 A1 * | 7/2012 | Nordstrom et al. ........... 405/205 |
| 2012/0263543 A1 * | 10/2012 | Lee .............................. 405/224 |
| 2012/0294681 A1 * | 11/2012 | Wong et al. ................... 405/224 |
| 2012/0304911 A1 * | 12/2012 | McCoy ......................... 114/264 |

FOREIGN PATENT DOCUMENTS

GB 2400823 * 10/2004 ............. B63B 35/44

* cited by examiner

*Primary Examiner* — Fredrick L Lagman
(74) *Attorney, Agent, or Firm* — Matthew J. Lattig; Charter IP, LLC (57) ABSTRACT

A floating wind farm includes a plurality of floating rafts connected with one another and being disposed in a body of water below the water by a predetermined distance; a plurality of wind turbines connected to the floating rafts respectively and being configured to be driven by wind and thereby generate power; a power generator connected to the floating rafts; a plurality of anchors connected to the floating rafts respectively and disposed in the body of water for confining the location of the floating rafts. Each of the floating rafts includes at least three pipes and a plurality of ballast blocks attached to the pipes. The pipes are configured to store air compressed by the power generated by the wind turbines. The power generator is configured to generate and output electricity from the compressed air stored in the pipes.

21 Claims, 12 Drawing Sheets

CLOSE-ENDED NODE

OPEN-ENDED NODE

FLOATING WIND FARM WITH ENERGY STORAGE FACILITY

FIELD OF THE PATENT APPLICATION

The present patent application generally relates to wind power technologies and more specifically to a deep water floating wind farm with energy storage facilities that utilizes a submerged raft to support wind turbines and with its structural elements to store wind generated power using Compressed Air Energy Storage (CAES) technology, giving a stable electricity output.

BACKGROUND

Wind power is intermittent making it difficult for the grid to accept its power. The output from a wind farm is usually to pass through an electronic filter to regulate the voltage and frequency etc. before it is uploaded. A general rule is that the wind power cannot exceed 20-23% of the base load power; otherwise the unsteady output from the wind power will cause the grid to be overloaded and shut down. An energy storage unit which can store wind energy up to long hours such as 24 hours would help to relax or eliminate the restriction of the wind energy to be uploaded to the grid, since the regenerated power from the storage is stable and in good quality ready for upload.

The present methods for deep water wind turbine foundation are mainly those borrowed from offshore oil industry which uses either steel tubes as piles or concrete caisson foundation resting on the seabed. Floating wind turbines have been suggested and tested but the isolated floating turbines are easily affected by the surface wave. The piles/caisson foundation for the much lighter wind turbines would end up with an out-of-proportion foundation cost compared with the much heavier offshore oil drilling platform. The large number of turbines in a wind farm also makes this type of foundation impracticable for deep water applications.

The present patent application addresses these two major concerns: deep water foundation and intermittent nature of renewable energy, and resolves them with floating raft base incorporated with energy storage facility.

SUMMARY

The present patent application is directed to a floating wind farm with energy storage facility. In one aspect, the floating wind farm includes a plurality of floating rafts connected with one another and being disposed in a body of water below the water by a predetermined distance; a plurality of wind turbines connected to the floating rafts respectively and being configured to be driven by wind and thereby generate power; a power generator connected to the floating rafts; and a plurality of anchors connected to the floating rafts respectively and disposed in the body of water for confining the location of the floating rafts. Each of the floating rafts includes at least three pipes forming a plane grid and a plurality of ballast blocks attached to the pipes, the pipes being configured to store air compressed by the power generated by the wind turbines. The power generator is configured to generate and output electricity from the compressed air stored in the pipes.

The floating wind farm may further include a platform housing the power generator and being mechanically supported by the floating rafts. The ballast blocks may be made of concrete, iron, or lead.

The floating wind farm may further include a platform housing the power generator and being mechanically supported by the bed of the body of water.

A plurality of the pipes may be constructed into a structure to house the power generator. Each floating raft and each wind turbine may be connected through a sphere and a holding tube connected with the sphere and including a flange, the wind turbine being bolted onto the flange. The floating wind farm may further include stiffening struts. The stiffening struts are fixed to the pipes and the holding tube. The floating rafts may be connected with one another through a plurality of pipes, all the pipes and the holding tubes being connected through the spheres, the pipes penetrating the walls of the spheres and being welded to the spheres. Air may be isolated from one pipe to another by a capping. The capping may include a high pressure hatch door, the high pressure hatch door being configured to open when the air pressure at the two sides of the high pressure hatch door is equal.

In another aspect, the floating wind farm includes a plurality of floating rafts connected with one another and being disposed in a body of water below the water by a predetermined distance; a plurality of wind turbines connected to the floating rafts respectively and being configured to be driven by wind and thereby generate power; a power generator connected to the floating rafts; and a plurality of anchors connected to the floating rafts respectively and disposed in the body of water for confining the location of the floating rafts. Each of the floating rafts includes a plurality of pipes, the pipes being configured to store air compressed by the power generated by the wind turbines. The power generator is configured to generate electricity from the compressed air stored in the pipes and output the electricity through a submarine cable.

In yet another aspect, the floating wind farm includes a plurality of floating rafts connected with one another and being disposed in a body of water below the water by a predetermined distance; a plurality of wind turbines connected to the floating rafts respectively and being configured to be driven by wind and thereby generate power; a power generator connected to the floating rafts; and a plurality of anchors connected to the floating rafts respectively and disposed in the body of water for confining the location of the floating rafts. Each of the floating rafts includes at least three pipes, the pipes being configured to store air compressed by the power generated by the wind turbines. The power generator is housed in a platform and configured to generate and output electricity from the compressed air stored in the pipes.

The platform may be mechanically supported by the floating rafts or the bed of the body of water.

DETAILED DESCRIPTION

Reference will now be made in detail to a preferred embodiment of the floating wind farm with energy storage facility disclosed in the present patent application, examples of which are also provided in the following description. Exemplary embodiments of the floating wind farm with energy storage facility disclosed in the present patent application are described in detail, although it will be apparent to those skilled in the relevant art that some features that are not particularly important to an understanding of the floating wind farm with energy storage facility may not be shown for the sake of clarity.

Furthermore, it should be understood that the floating wind farm with energy storage facility disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

In the description hereafter, when wind power is referred to relating to the energy storage, it also means wave power.

Referring to FIGS. 1 through 4, the CAES floating raft includes a plurality of steel pipes 1 with a diameter of 4 m to 5 m lying in the sea to form a giant raft to support the wind turbines 15 and at the same time being used as an energy storage unit for storing compressed air using Compressed Air Energy Storage (CAES) technology by converting the wind power into compressed air stored in the pipes. The plan resembles a Chinese Checker Board which has a lower (more economical) arm/turbine ratio. Other configurations are also possible. The thickness of the pipes depends on the air pressure. Each wind turbine deployed in the sea can be seen as a node and the distance between the nodes are usually taken as 7 times of the diameter of the turbine blades in order not to affect the downwind turbine. The diameter of the turbine blades is usually 60 m to 90 m and this gives the distance of 420 m to 630 m.

Figure 7:
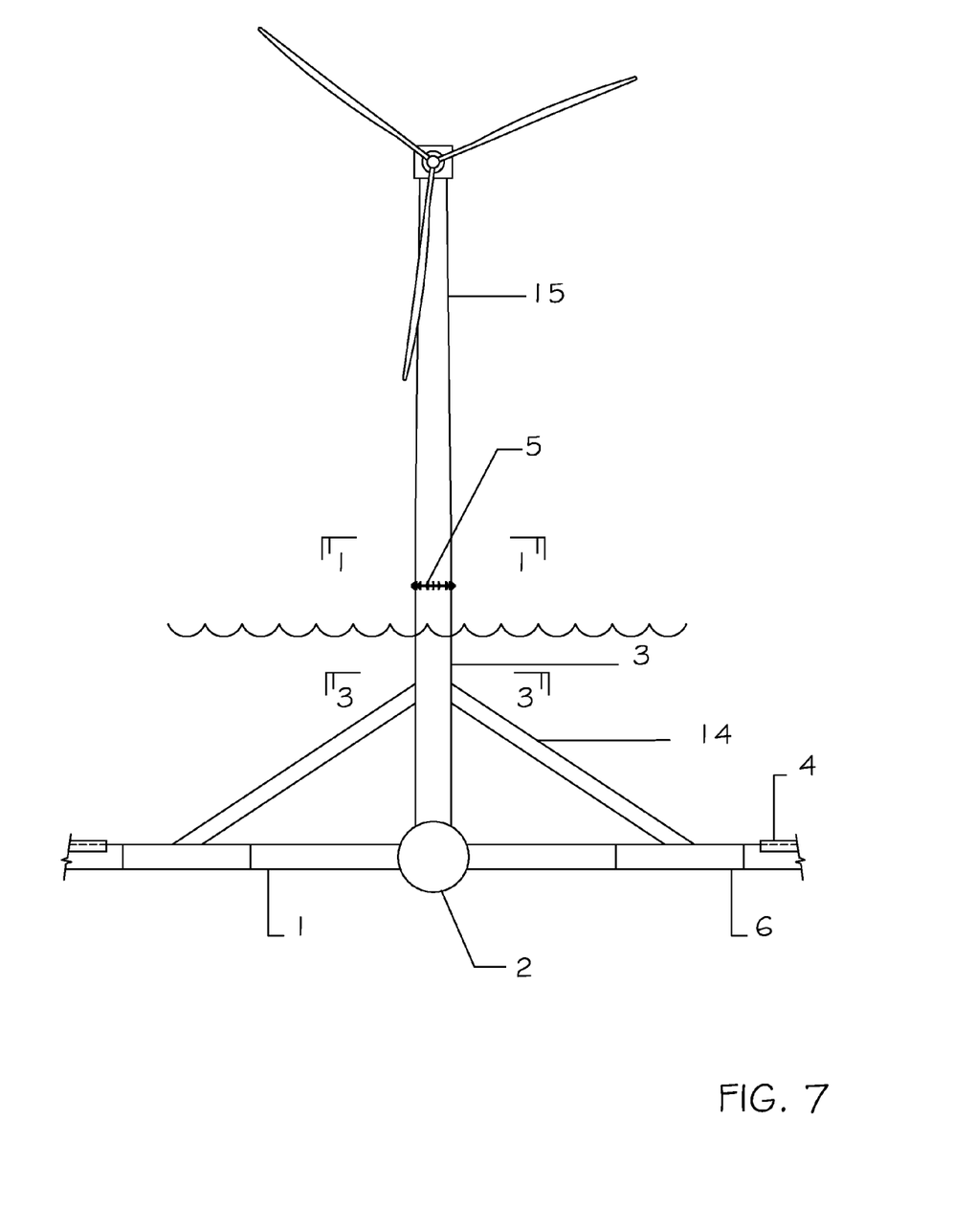
FIG. 7 is an elevation view of a typical node of the floating wind farm with energy storage facility depicted in FIG. 1.

The steel pipes 1 are designed to be suspended at a depth in the sea away from the wave actions. The steel pipes 1 can be viewed as being continuously supported by the water which also provides structural damping to the raft system. Therefore, the steel pipes 1 can span a great distance between nodes, similar to the bridge deck in a suspension bridge that the deck suspended by cables is usually 3 m to 4 m deep for a span between towers over 1000 m. The raft is designed to have its buoyancy to be balanced by its own weight and the added ballast blocks if needed. As shown in FIG. 7, which is an elevation view of a typical node of the floating wind farm with energy storage facility depicted in FIG. 1, concrete blocks 4 are used to add weight to the pipes 1 so that the self-weight is balanced by the buoyancy. Since the pipes are suspended in a depth not to be affected by the wave, the wave interacts only with the turbine shaft. The turbine shaft provides the necessary buoyancy for the whole setup.

Figure 9:
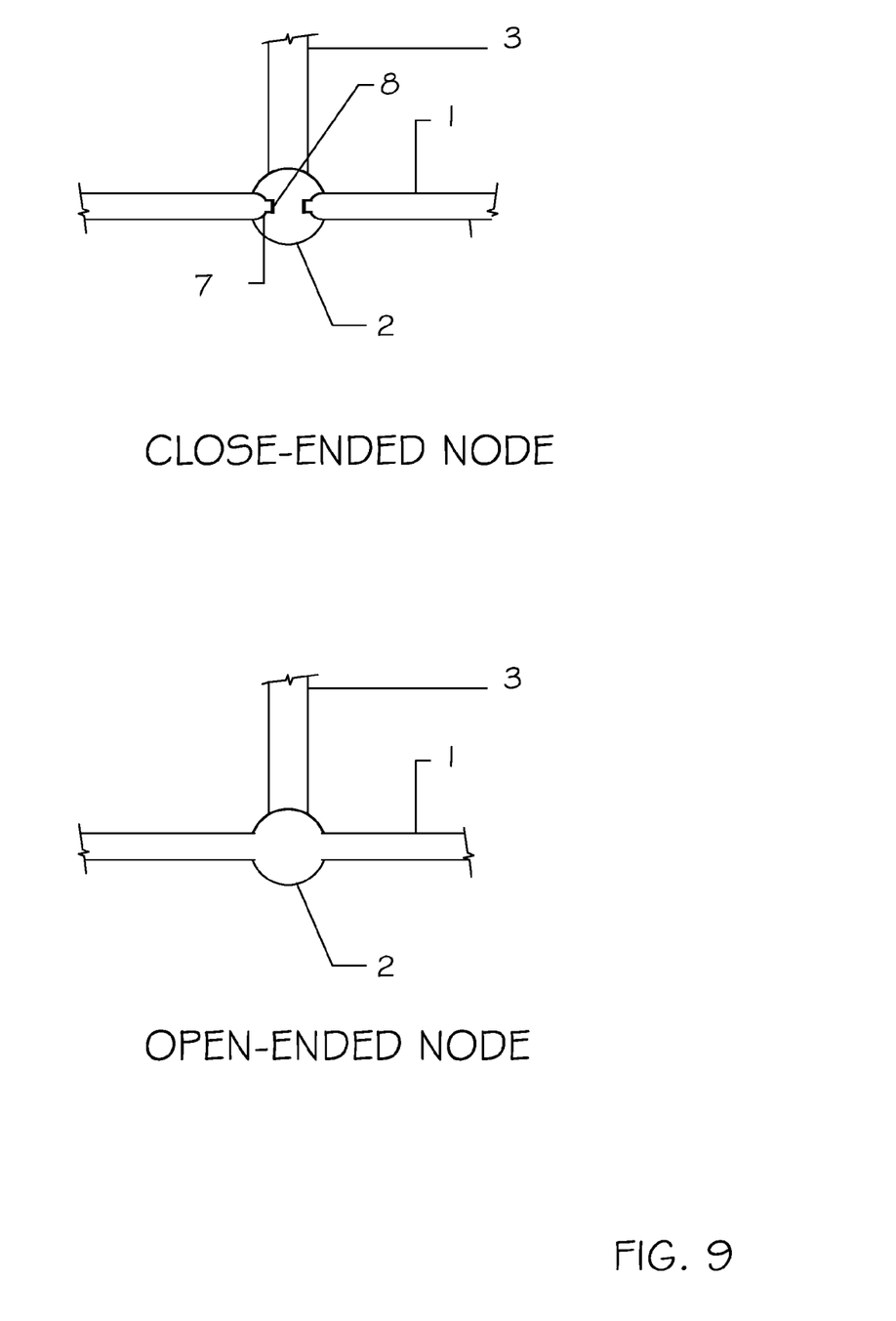
FIG. 9 shows the close-ended node and the open-ended node of the floating wind farm with energy storage facility depicted in FIG. 1.

The function of the raft is to provide a plane (horizontal) grid to support the turbine shafts. On plan, the steel pipes form a giant truss. The node of the truss is where the turbine is located. The node should be the vertex of a triangle enclosed by at least three pipes. Each node is provided with a steel ball-like sphere 2 for connecting the steel pipes 1. The steel pipes penetrate the wall of the sphere to which the pipes are welded. The pipes in a connection are either open-ended or close-ended, as illustrated in FIG. 9, which shows the close-ended node and the open-ended node of the floating wind farm with energy storage facility depicted in FIG. 1. The open-ended connection allows the air in the pipes to move freely from pipe to pipe. The close-ended connection stops the air exchange amongst pipes. The close-ended connection is used to divide the raft into a number of storage units. For maintenance and operation purposes at least two units should be formed.

Figure 4:
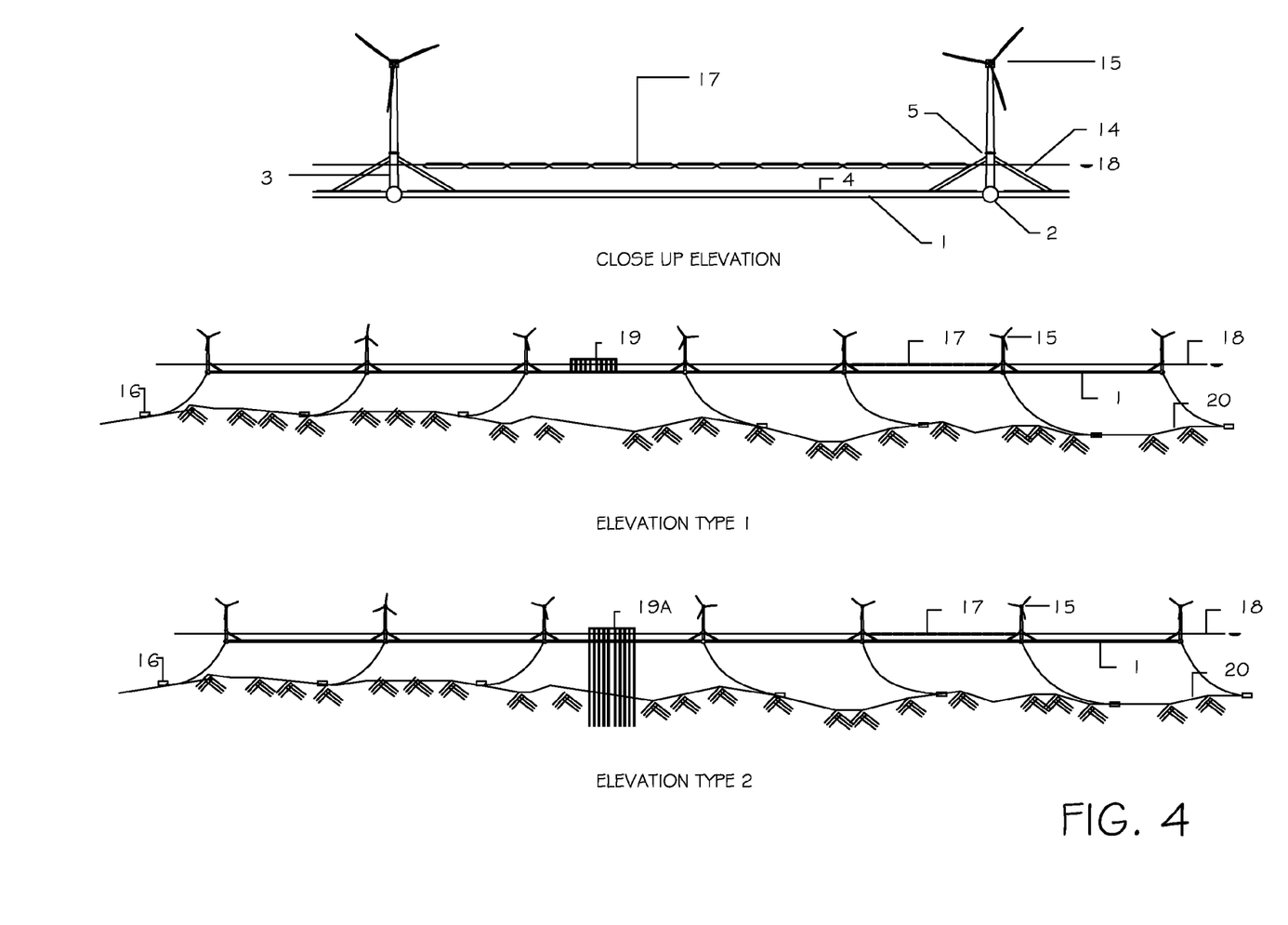
FIG. 4 is an elevation view of the CAES floating raft depicted in FIG. 1.

A holding tube 3 is welded to the top of the sphere at the node. The steel tube is extended above the maximum sea level and at the end is a flange connection plate 5 for bolted connection of the steel turbine shaft. The wind turbine 15 is designed to be bolted onto the flange 5 of the holding tube 3. The turbine 15 can be completely removed from the holding tube 3 by reversed procedures of installation. Elevation of the wind farm is shown in FIG. 4 in which 14 is the stiffening struts for the holding tube 3; 16 is the anchor, 17 is the wave power generation facility (if it is implemented), 18 indicates the average sea level and 20 indicates the seabed. A platform 19 housing the power generation facility can be supported by the raft at the center of the floating structure. It can be towed anywhere in the sea and moored by the anchors. The power generation facility is configured for generating power from the stored compressed air. Alternatively the floating raft and turbine combined is fixed to a central platform 19A that houses the power generation facility and is supported by piles or caisson resting on the seabed. However, anchors are still needed in this case since the length and width are too large to be constrained by a central fixity.

Alternatively, if the pipe's diameter is sufficient, one or two pipes can be constructed into an office or a plant room to house the power generation unit. Fresh air can be supplied from the compressed air storage and the exhaust can be released from one of the turbine shaft as a chimney while the surrounding water provides a constant temperature environment.

In operation, the electricity generated from the individual wind turbine will be used to drive the compressor located in the plant room. Alternatively, if the output of the wind turbine is compressed air instead of electricity, then the compressed air can be piped to the storage.

Figure 5:
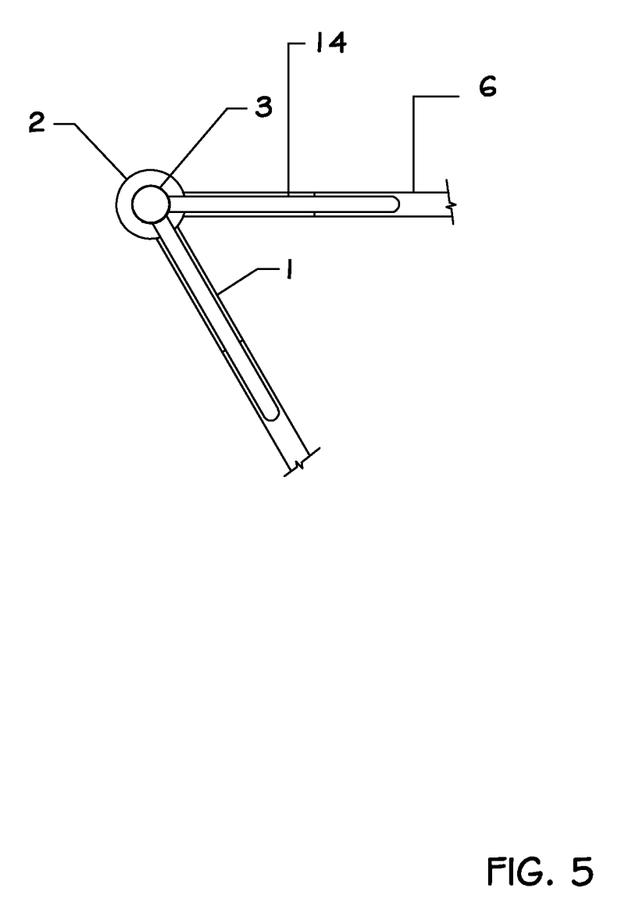
FIG. 5 is a plan view of an external node of the CAES floating raft depicted in FIG. 1.

FIG. 5 shows a partial plan view of an external node where two pipes 1 connect to the sphere 2 at the node to form a basic triangle with the 3$^{rd}$ pipe (not shown). Two stiffening struts 14 support the holding tube 3 from the thickened part 6 of pipe 1.

Figure 6:
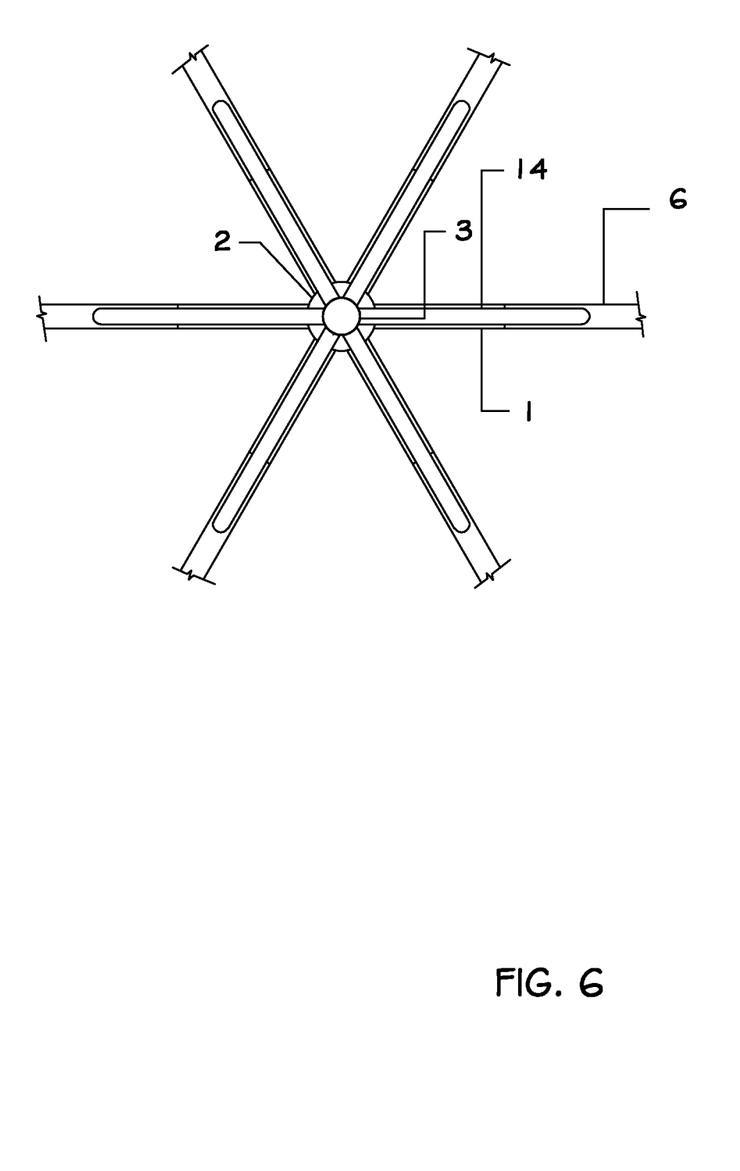
FIG. 6 is a plan view of an internal node of the CAES floating raft depicted in FIG. 1.

FIG. 6 shows a partial plan view of an internal node where six pipes 1 connect to the sphere 2 at the node to form a group of triangles (with the 3$^{rd}$ base pipes not shown). Six stiffening struts 14 support the holding tube 3 from the thickened part 6 of pipe 1.

FIG. 7 is an elevation view of an internal node where the turbine shaft 15 is bolted to the holding tube 3 through the flange 5. The holding tube 3 is supported by the stiffening struts 14 from the locally thickened part 6 of the pipe 1. The concrete ballast blocks 4 are added to the pipes 1. It is noted that the ballast blocks may be made of concrete, iron, lead or other materials, and may be eliminated if they are not needed to balance the buoyancy.

Figure 8:
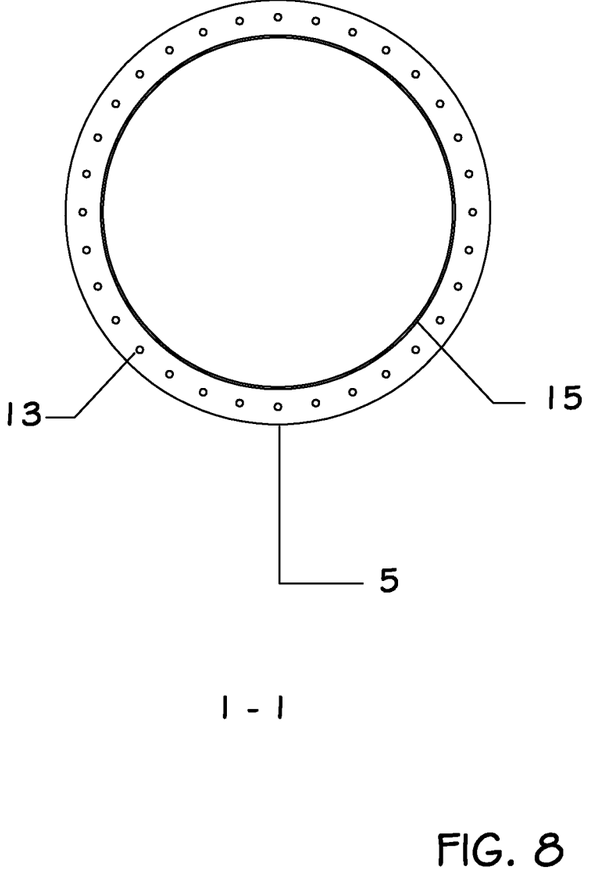
FIG. 8 shows a cross section of a turbine shaft of the floating wind farm with energy storage facility depicted in FIG. 1.

FIG. 8 shows the cross section of the turbine shaft 15 at the flange 5 with pre-drilled bolt holes 13. FIG. 9 shows the close-ended node and the open-ended node of the floating wind farm with energy storage facility depicted in FIG. 1. In the case of close-ended node that connects the pipes 1 and the holding tube 3, the hemispheric end cap 7 of pipe 1 is provided with a high pressure maintenance hatch door 8 which can only be opened when the air pressure at the two sides of the hatch door is equal. In the open-ended node that connects the pipes 1 and the holding tube 3, the pipes 1 are simply open to the sphere.

Figure 10:
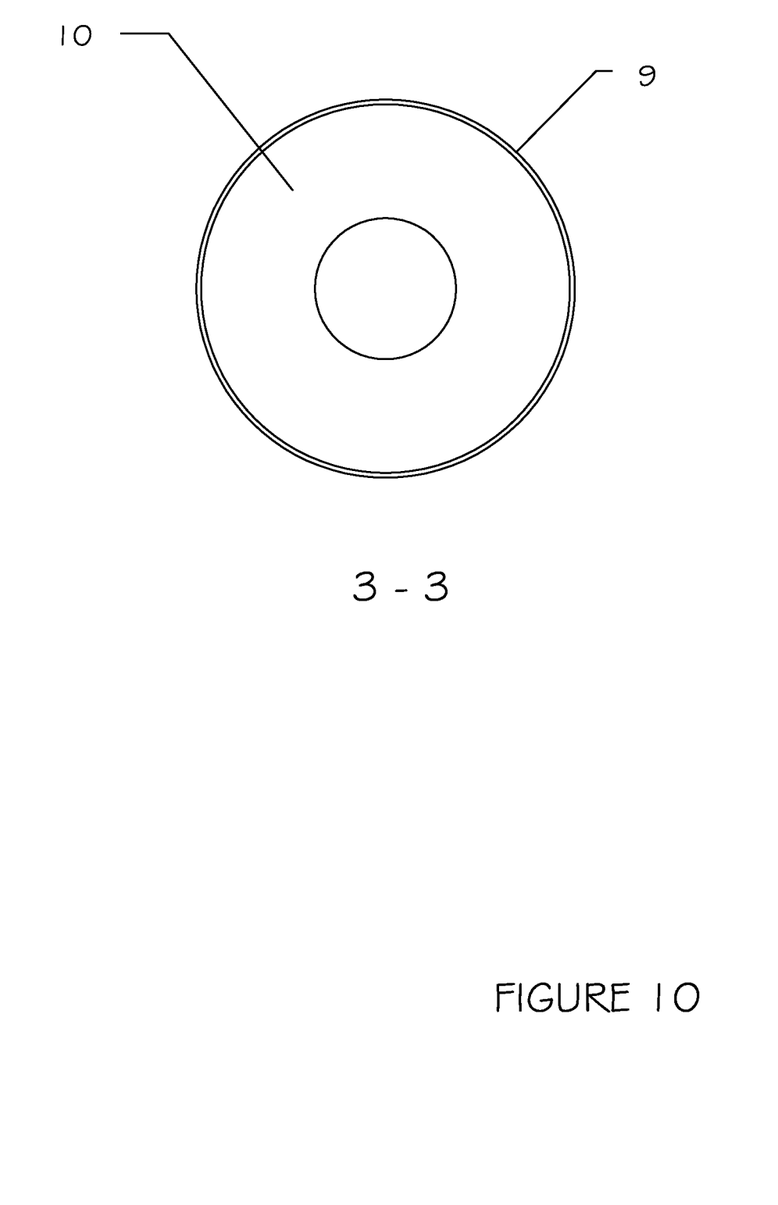
FIG. 10 shows a cross-section of the holding tube at the junction of the stiffening struts of the floating wind farm with energy storage facility depicted in FIG. 1.
Figure 11:
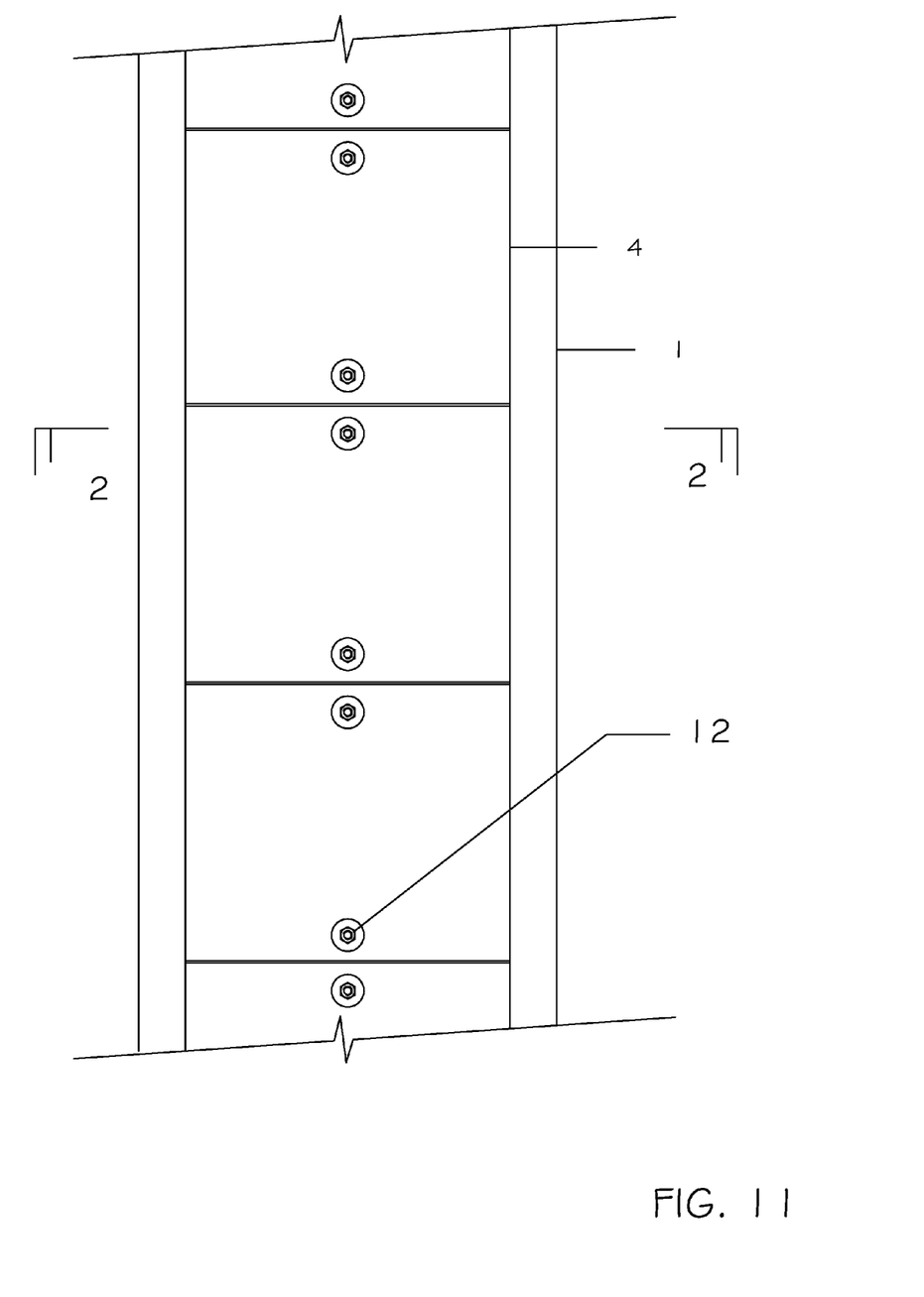
FIG. 11 is a partial plan view of the pipe and the concrete ballast with the anchor bolt and nut in the floating wind farm with energy storage facility depicted in FIG. 1.
Figure 12:
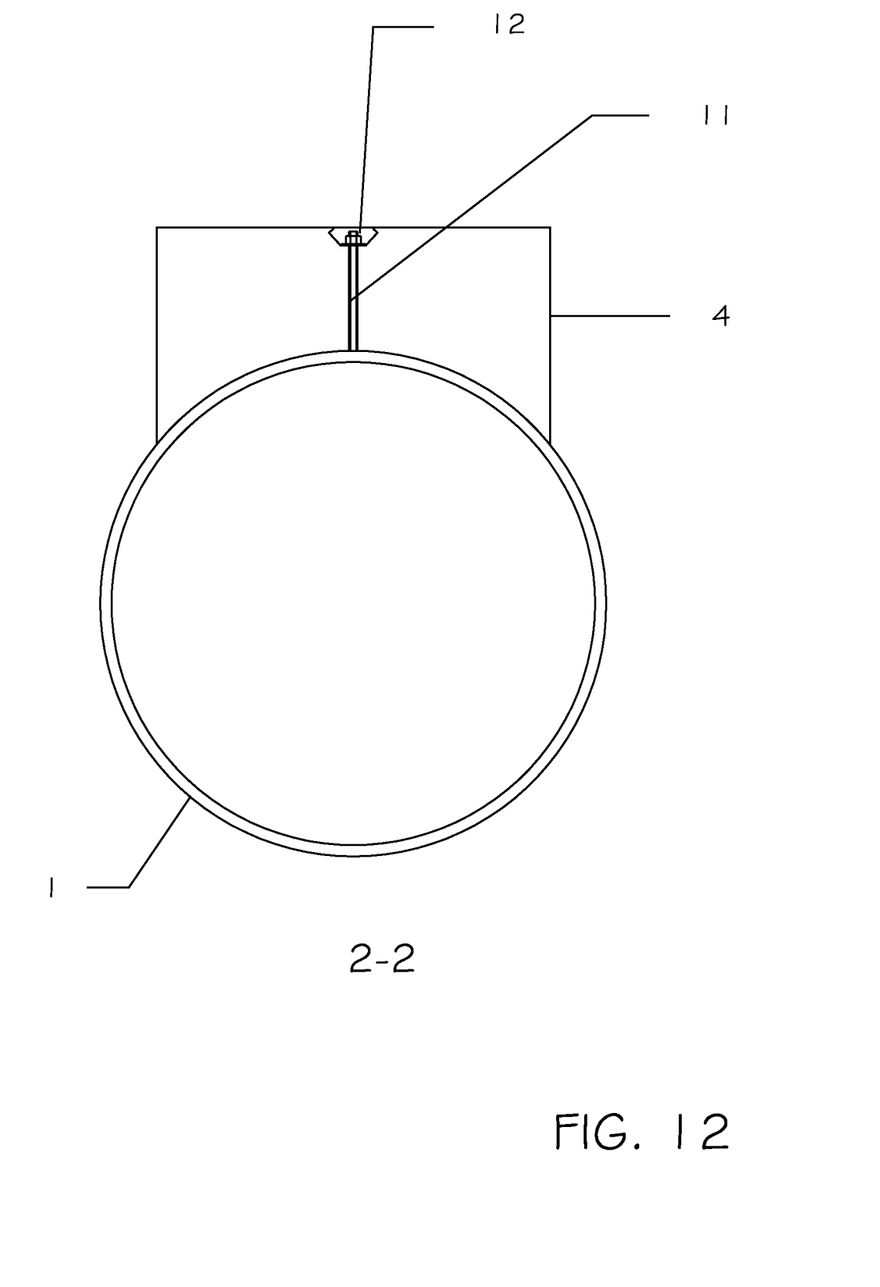
FIG. 12 shows a cross-section of the pipe and the concrete ballast being fixed by the anchor bolt and the nut and washer in the floating wind farm with energy storage facility depicted in FIG. 11.

FIG. 10 shows a cross-section of the holding tube at the propping level where a working platform 10 with central access is provided. It also acts as a diaphragm to strengthen the wall 9 at the propping location. FIGS. 11 and 12 is a partial plan view and a cross-sectional view /respectively of the pipes 1 and the concrete ballast blocks 4 with the anchor bolts 11 and nuts 12 holding the system.

Working Principle of the Floating Raft Base

The working principle of the floating raft base in this embodiment of the present patent application is based on the fact that the raft is stable when it is placed in the water. The steel pipes used to form the raft are substantially large in size in order to have adequate stiffness to take the bending moment resulted from the movement of the wind turbines it carries. The distance between turbines is approximately 500 m. The dimension of the pipe has to be in the range of 4 to 5 m giving a span/depth ratio of 500/4=125 to 500/5=100 respectively. The ratio is comparable with that of a suspension bridge where the deck is usually 3.5 to 5 m for a span of 1000 m or more achieving a span/depth ratio of 1000/3.5=285 and 1000/4=250 respectively. In the suspension bridge, the deck is hung by the cables hence it can be shallow. Likewise, the pipe being laid in the sea is supported, in a similar way as the suspended deck; by the water hence it can span over 500 m. Calculation shows that the longitudinal bending stress in the pipe will not be more than 120 MPa induced by a displacement of 15 m in any node that resembles the displacement under extreme wave conditions. Adding this bending stress to the air pressure induced axial tensile stress of around 160 MPa, the net stress (160+120=280 MPa and 160−120=40 MPa) is still within the limit of yield stress. Furthermore, the net stress is in tension which eliminates the problems associated with local and global buckling. The structure is more stable with the presence of the air pressure.

In the center of the raft, a platform in a separate or attached structure houses the power generators that will operate in compressed air. Electricity generated will be transmitted to shore by submarine cable. The gravity load on the raft from the wind turbines is not significant due to the floatation effect. The horizontal load and moment from the wind acting on the turbines, as well as wave load are the critical loads to the raft. Due to the large distance of wind turbine spacing, the dimension of the structural elements of the raft has to be substantial. Steel pipes of 4 m to 5 m diameter have to be used. The space in the pipes provides an opportunity for building a giant energy storage unit using Compressed Air Energy Storage (CAES) technology. The power output by each individual wind turbine will be transformed into compressed air stored in the raft. The incorporation of an energy storage unit would help the wind farm output to become a reliable, stable and a high quality source.

In the compression cycle, air will be heated and it has to be cooled before it can further be compressed. This is done in staged compressions and by inter-coolers. In the expansion cycle, air becomes cold, down to sub-zero degrees. It needs to absorb heat to work efficiently in the turbo-expander. Since the pipes are submerged in the sea which can be regarded as constant temperature in the daily cycle of compression and decompression, the sea can act as a heat exchanger for the air to reject heat into the sea during the compression cycle and to take in heat during the expansion cycle. The present turbo-expander generator technology requires the compressed air to be mixed with small quantity of fuel to burn in order to regain the momentum to work in the turbo-expander. Gas turbo-expander generator uses $\frac{2}{3}$ of the energy in the fossil-fuel to compress the air in its compressor. Therefore, using the compressed air that is bypassing the compressor would reduce the fuel consumption by $\frac{2}{3}$. Such setup as in the Huntorf plant since 70's is still in use. Research on new plants that incorporate a heat recuperator to reduce or completely eliminate the needs for burning fuel is ongoing. The sea provides a mechanism of heat recuperator to a certain extent and therefore the consumption of fuel in this embodiment will be smaller than those without the heat-recuperator.

Maintenance and Safety Measures

Maintenance is similar to the maintenance of a ship hull. Internal access is through the pipes and sphere at the open-ended nodes and through the hatch door 8 at the close-ended node. Safety devices are designed to be incorporated into the operation. Staff may be required to operate the power generation unit depending on the degree of automation and the setup.

Safety measures should follow the established procedures for working in pressurized compartment. The system should provide air pressure gauges, releasing valves and warning and monitoring system in which the signals are relayed to a control center. Access into the compressed air compartment can only be gained after the air pressure in the compartment is decompressed to the atmospheric pressure. Emergency decompression chamber is also provided within each CAES unit for people accidentally trapped inside the compressed compartment.

Risk Assessment

Risks of the wind farm include the possibility of the wind farm being drifted away from the anchored position by unexpected strong current. This can be resolved by a proper design of anchorage system with supplementary measures such as propellers or high pressure air jets from the stored compressed air to steer the raft, or sails. The wind farm position should also be mapped by the satellite and broadcasted worldwide to shipping operators so that they know where it is in real time. The environmental impact should be minimal since it does not cause any pollution. The raft is suspended in a depth of over 15 m in order to avoid wave actions. At this depth, most of the ships can pass over the pipes if they enter the farm accidentally. Warning signs should be erected to warn the ships to steer away from the wind farm.

APPLICATION EXAMPLES

Loading and Stress Analysis

Figure 1:
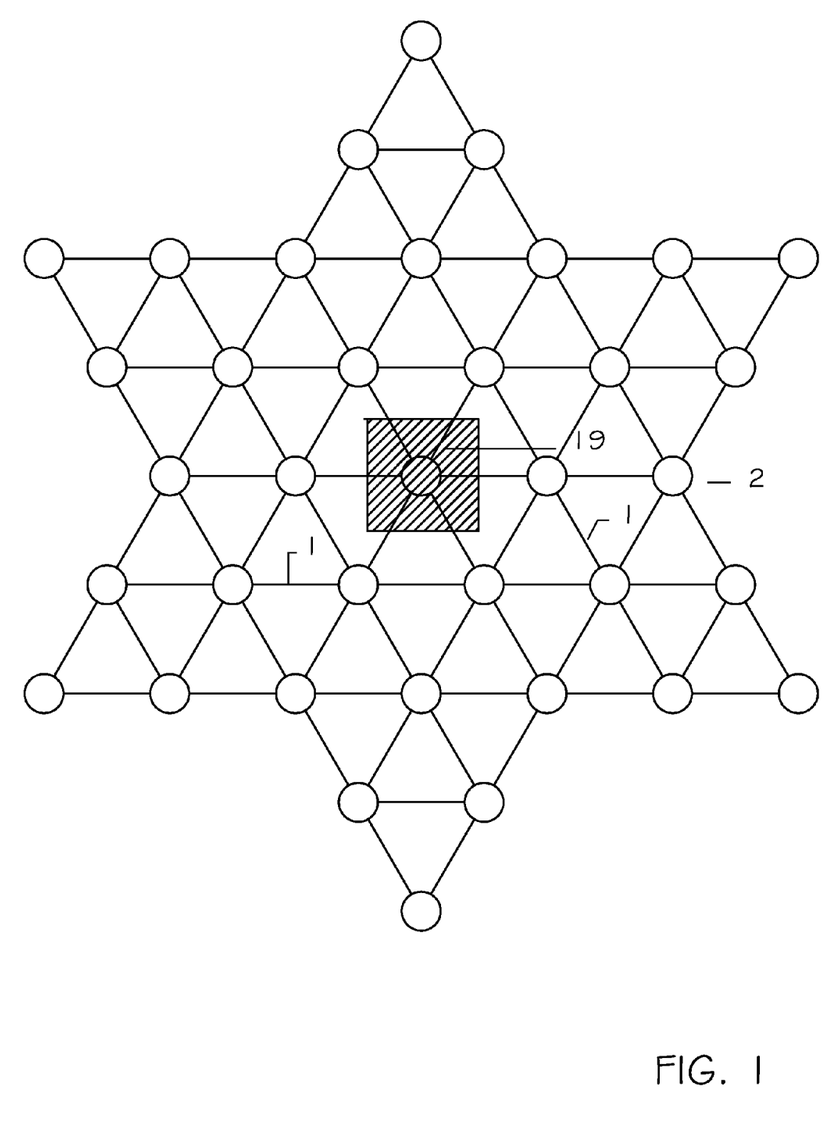
FIG. 1 is a schematic plan view of the Compressed Air Energy Storage (CAES) floating raft for the floating wind farm with energy storage facility according to an embodiment of the present patent application.
Figure 2:
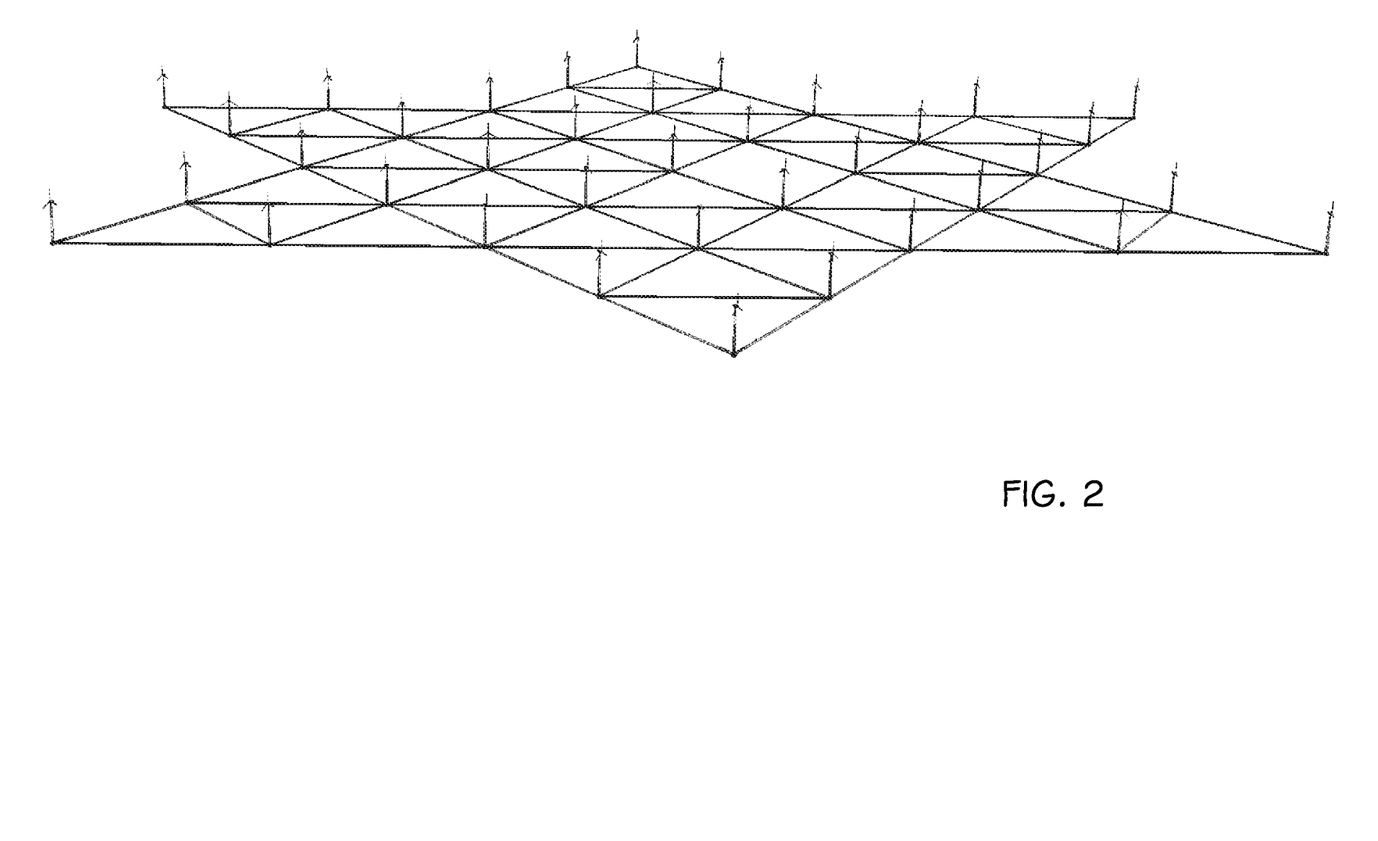
FIG. 2 is an overall perspective view of the floating wind farm depicted in FIG. 1.
Figure 3:
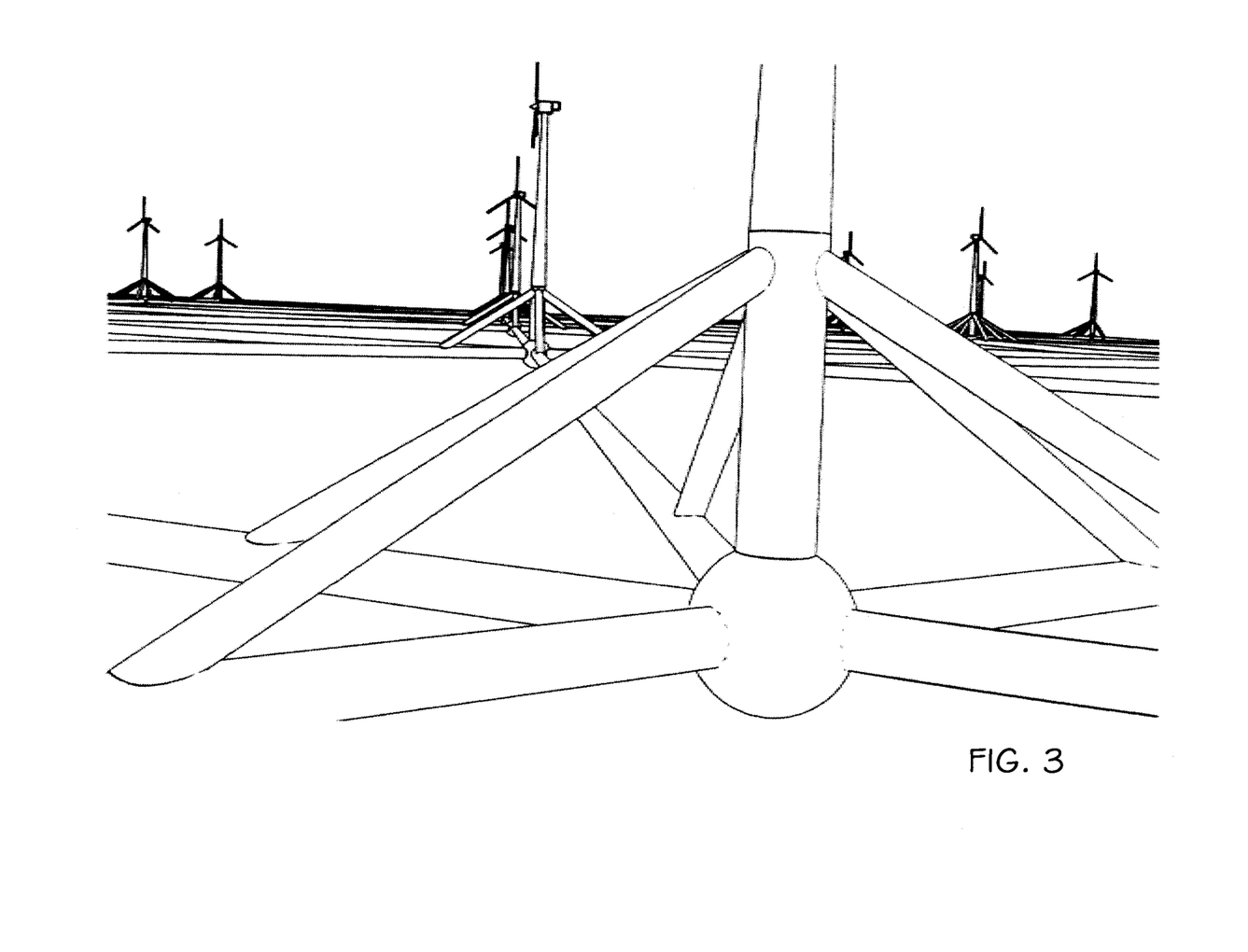
FIG. 3 is a close-up perspective view of the floating wind farm depicted in FIG. 2.

Referring to FIG. 1, this configuration which is formed by triangulation of the pipes 1 is structural stable due to the triangulation of structural elements. It gives a low arm/node number and hence is quite efficient and it is submerged and suspended in the sea. Other variations are also possible. In this embodiment, design parameters for this application are the following:

| | |
|---|---|
| Turbine distance | 550 m |
| Diameter of steel pipe | 4.5 m |
| Thickness of steel pipe | 70 mm |
| Maximum air pressure (same as Germany Huntorf CAES power plant) | 70 bars (7.0 MPa) |
| Load factor | |
| Serviceability Limit State (SLS) | 1.1 |
| Ultimate Limit State (ULS) | 1.3 |
| Number of turbine | 37 |
| Characteristic yield stress for plate thickness greater than 40 mm | 340 MPa |
| Material safety factor | 1.05 |
| Factor for inaccuracy in assessment | |
| Serviceability Limit State (SLS) | 1.0 |
| Ultimate Limit State (ULS) | 1.1 |

Stress in the steel pipe subject to an internal air pressure can be calculated by the equations according to Timoshenko and Woinowsky-Kriegers as follows:

Hoop stress $SH = R*P/t$

Axial stress $SA = R*P/(2*t)$, where R is the radius of the pipe, P is the internal pressure in the pipe, and t is the thickness of the pipe.

Using the Limit State design concept, the design calculation is as follows:

At SLS

Design pressure $1.0*1.1*7 = 7.7$ MPa

Hoop stress $SH = 2.25*7.7/0.07 = 248$ MPa

Axial stress $SA = 2.25*7.7/(2*0.07) = 124$ MPa

Allowable yield stress:

$340/(1.05) = 324$ MPa

Stress condition satisfied.

At ULS

Design pressure $1.1*1.3*7 = 10.01$ MPa

Hoop stress $SH = 2.25*10.01/0.07 = 322$ MPa

Axial stress $SA = 2.25*10.01/(2*0.07) = 161$ MPa

Allowable yield stress:

$340/(1.05) = 324$ MPa

Stress condition satisfied.

Analysis shows that the bending stress in the pipe under the action of the waves that displace one of the nodes by 15m in an extreme case is around 100 MPa. Adding this to the axial stress in a fully pressurized pipe will result in $161+100=261$ MPa and $161-100=61$ MPa respectively in the two bending faces. Both are less than the allowable yield stress. Using the von Mises yield criterion, the VM stress is $SQRT((322^2 + 261^2 + (322-261)^2)/2) = 296$ MPa which is less than the allowable yield stress, and therefore, the stress condition is acceptable. Since the net stress is in tension, there should be no buckling locally or globally. It is structurally more stable with the presence of the air pressure in the pipe than without it.

Compressed Air Storage Volume

The scheme produces a storage space of 775,000 m$^3$ (the two existing energy storage power plants German's Huntorf and USA's McIntosh plant are equipped with storage space of 310,000 m$^3$ and 500,000 m$^3$ respectively). The stored energy is estimated by $P*V = 7$ MN/m$^2$ * $775,000 = 5,425,000$ MJ $= 1,500,000$ kW-h. Succar et. al. suggested that a figure of power reproduction rate 2.4 kW-h per m$^3$ of compressed air can be used in the working range of air pressure (40 bars to 65 bars) and this works out to 1,860,000 kW-h. For 37 of 3.5 MW turbines and a capacity factor of 0.45 for open sea condition, the stored power is equivalent to 25 hours of the continuous wind power output from the farm. The quality of the electricity output should be no different from a fossil-fuel turbo-generator and can be uploaded without worry of its unsteady origin.

The configuration of the wind farm can be repeated by joining two or more units together and share one generator. Each unit is a separate storage. The floating structure can be easily adapted to wave power generation providing dual energy sources.

Summary of the Functions of the Raft

In the above embodiments, the functions of the raft include but are not limited to the following. It is a raft base submerged and suspended in the water at the depth not affected by wave. The raft base supports the turbines. The raft base can support wave power generators. The raft base can support a platform which houses the power generation facilities. The steel pipes that form the raft base are used to stored wind energy using CAES. A number of steel pipes is grouped together to form an Energy Storage Unit. The generated power from the stored compressed air is transmitted to shore by submarine cables. One or several pipes can be converted into office, plant room or eco-tourist center. The pipes can be modified to have glass window to be used as marine observation deck. The raft can become a shelter for the fish stock.

Socio-Economical and Environmental Benefits

The socio-economical and environmental benefits of the above embodiments of the present patent application are the following. The wind farm supported by the floating raft with the capability of storing the power for long hours of the wind farm output is a major improvement over traditional offshore wind farms. The space provided amongst the nodes can be developed into wave power station, storing its generated energy in the CAES raft. The deployment of this new wind farm setup is not limited by the water depth and that the CAES facilitates to smooth the output of the power from the wind farm and the wave power station (if this is implemented). Considering the ability of this new wind farm setup can be deployed anywhere in deep water with the same raft base and the energy storage capability, the economic gains are tremendous.

Deep water wind farms can be installed in large numbers, and since they are equipped with CAES, the grid share limitation imposed on wind power can be lifted (general rule nowadays is that wind power in the grid should not exceed 20-23% due to the unstable supply of the wind power). In wind energy rich countries such as UK and those around the North Sea and those having long costal lines such as USA, Canada and China, the nation can be powered by wind at large scale. Those island nations such as Japan, Australia, New Zealand, Malaysia, Indonesia and etc. can be powered almost completely by wind, or at least increase the wind power penetration into the base load. This will help with combating the global warming; reduce the reliance on fossil fuel and other non-sustainable energy resources including nuclear power.

Since it is deployed in deep water zone further away from the shore and is outside the sight distance from the shore, it will attract less objections against visual impact and noise nuisance from the community. Its submerged structure provides shelters to the fish stock. It is also possible to turn the wind farm into an eco-tourist center by converting one or several pipes into marine observation deck with windows built into the pipes.

While the present patent application has been shown and described with particular references to a number of embodiments thereof, it should be noted that various other changes or modifications may be made without departing from the scope of the present invention.

What is claimed is:

1. A floating wind farm comprising:
a plurality of individual floating rafts, each individual floating raft having a self-weight with ballast blocks thereon that is balanced by the buoyancy of the raft to suspend the raft at a depth below sea level which avoids wave action, each individual floating raft formed from a plurality of pipes, including a set of three pipes of which are connected to each other so that each individual floating raft assumes a triangular shape, each of the triangular-shaped floating rafts further interconnected to one another so as to form a horizontal network of interconnected floating rafts over a body of water supporting a plurality of wind turbines in spaced relation thereon, with vertices of each triangular-shaped floating raft in the network serving as a node, each node having a wind turbine thereat that is mechanically supported at its node and extending above the surface of the body of water, thereby providing the plurality of spaced-apart wind turbines extending across the body of water via the horizontal network;
the plurality of wind turbines being configured to be driven by wind to thereby generate power, with the pipes being configured to store air compressed by the power generated by the wind turbines therein;
a power generator connected to the floating rafts; and
a plurality of anchors connected to the floating rafts and disposed in the body of water for confining the location of the floating rafts;
wherein
the power generator is configured to generate and output electricity from the compressed air stored in the pipes.

2. The floating wind farm of claim 1 further comprising a platform housing the power generator and being mechanically supported by the floating rafts, the ballast blocks being made of concrete, iron, or lead.

3. The floating wind farm of claim 1 further comprising a platform housing the power generator and being mechanically supported by the bed of the body of water.

4. The floating wind farm of claim 1, wherein a plurality of the pipes are constructed into a structure to house the power generator.

5. The floating wind farm of claim 1, wherein each floating raft and each wind turbine are connected through a sphere, with a holding tube connected with the sphere and further comprising a flange, the wind turbine being bolted onto the flange, and further the sphere representing the node, the sphere subject to the compressed air stored in the pipes.

6. The floating wind farm of claim 5 further comprising a plurality of stiffening struts, wherein the stiffening struts are fixed to the pipes and the holding tube.

7. The floating wind farm of claim 6, wherein the floating rafts are connected with one another through a plurality of pipes, all the pipes and the holding tubes being connected through the spheres, the pipes penetrating the walls of the spheres and being welded to the spheres.

8. The floating wind farm of claim 7, wherein air is isolated from one pipe to another by a capping.

9. The floating wind farm of claim 8, wherein the capping comprises a high pressure hatch door, the high pressure hatch door being configured to open when the air pressure at the two sides of the high pressure hatch door is equal.

10. The floating wind farm of claim 1, wherein a diameter of the pipe is at least 4m, and a distance between adjacent nodes is at least 400m.

11. A floating wind farm comprising:
a plurality of individual floating rafts, each individual floating raft having a self-weight with ballast blocks thereon that is balanced by the buoyancy of the raft to suspend the raft at a depth below sea level which avoids wave action, each individual floating raft formed from a plurality of pipes, including a set of three pipes of which are connected to each other so that each individual floating raft assumes a triangular shape, each of the triangular-shaped floating rafts further interconnected to one another so as to form a horizontal network of interconnected floating rafts over a body of water supporting a plurality of wind turbines in spaced relation thereon, with vertices of each triangular-shaped floating raft in the network serving as a node, each node having a wind turbine thereat that is mechanically supported at its node and extending above the surface of the body of water, thereby providing the plurality of spaced-apart wind turbines extending across the body of water via the horizontal network; p1 the plurality of wind turbines being configured to be driven by wind to thereby generate power, with the pipes being configured to store air compressed by the power generated by the wind turbines therein;
a power generator connected to the floating rafts; and
a plurality of anchors connected to the floating rafts and disposed in the body of water for confining the location of the floating rafts;
wherein
the power generator is configured to generate electricity from the compressed air stored in the pipes and output the electricity through a submarine cable.

12. The floating wind farm of claim 11 further comprising a platform housing the power generator and being mechanically supported by the floating rafts.

13. The floating wind farm of claim 11, wherein each floating raft and each wind turbine are connected through a sphere, with a holding tube connected with the sphere and further comprising a flange, the wind turbine being bolted onto the flange, and further the sphere representing the node, the sphere subject to the compressed air stored in the pipes.

14. The floating wind farm of claim 13 further comprising a plurality of stiffening struts, wherein the stiffening struts are fixed to the pipes and the holding tube.

15. The floating wind farm of claim 14, wherein the floating rafts are connected with one another through a plurality of pipes, all the pipes and the holding tubes being connected through the spheres, the pipes penetrating the walls of the spheres and being welded to the spheres.

16. The floating wind farm of claim 15, wherein air is isolated from one pipe to another by a capping.

17. The floating wind farm of claim 16, wherein the capping comprises a high pressure hatch door, the high pressure hatch door being configured to open when the air pressure at the two sides of the high pressure hatch door is equal.

18. A floating wind farm comprising:
a plurality of individual floating rafts, each individual floating raft having a self-weight with ballast blocks thereon that is balanced by the buoyancy of the raft to suspend the raft at a depth below sea level which avoids wave action, each individual floating raft formed from a plurality of pipes, including a set of three pipes of which are connected to each other so that each individual floating raft assumes a triangular shape, each of the triangular-shaped floating rafts further interconnected to one another so as to form a horizontal network of interconnected floating rafts over a body of water supporting a plurality of wind turbines in spaced relation thereon, with vertices of each triangular-shaped floating raft in the network serving as a node, each node having a wind turbine thereat that is mechanically supported at its node and extending above the surface of the body of water, thereby providing the plurality of spaced-apart wind turbines extending across the body of water via the horizontal network;

the plurality of wind turbines being configured to be driven by wind to thereby generate power, with the pipes being configured to store air compressed by the power generated by the wind turbines therein;

a power generator connected to the floating rafts; and a plurality of anchors connected to the floating rafts and disposed in the body of water for confining the location of the floating rafts;

wherein the power generator is housed in a platform and configured to generate and output electricity from the compressed air stored in the pipes.

19. The floating wind farm of claim 18, wherein the platform is mechanically supported by the floating rafts or the bed of the body of water.

20. The floating wind farm of claim 18, wherein each floating raft and each wind turbine are connected through a sphere, with a holding tube connected with the sphere and further comprising a flange, the wind turbine being bolted onto the flange, and further the sphere representing the node, the sphere subject to the compressed air stored in the pipes.

21. The floating wind farm of claim 20, wherein the floating rafts are connected with one another through a plurality of pipes, all the pipes and the holding tubes being connected through the spheres, the pipes penetrating the walls of the spheres and being welded to the spheres, air being isolated from one pipe to another by a capping, the capping comprising a high pressure hatch door, the high pressure hatch door being configured to open when the air pressure at the two sides of the high pressure hatch door is equal.

* * * * *